(12) United States Patent
Seger et al.

(10) Patent No.: US 9,106,532 B2
(45) Date of Patent: *Aug. 11, 2015

(54) METHOD FOR UPDATING DEVICE DESCRIPTIONS FOR FIELD DEVICES IN PROCESS AUTOMATION TECHNOLOGY

(75) Inventors: Andrea Seger, Schopfheim (DE); Bert Von Stein, Waldkirch (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/552,065

(22) Filed: Jul. 18, 2012

(65) Prior Publication Data
US 2012/0284377 A1    Nov. 8, 2012

Related U.S. Application Data

(63) Continuation of application No. 10/522,586, filed as application No. PCT/EP03/07839 on Jul. 18, 2003, now Pat. No. 8,250,174.

(30) Foreign Application Priority Data

Jul. 26, 2002  (DE) .................................. 102 34 304

(51) Int. Cl.
| | | |
|---|---|---|
| G06F 15/177 | (2006.01) | |
| H04L 12/24 | (2006.01) | |
| G05B 19/042 | (2006.01) | |
| H04L 12/28 | (2006.01) | |
| H04L 12/40 | (2006.01) | |

(52) U.S. Cl.
CPC ............ *H04L 41/082* (2013.01); *G05B 19/042* (2013.01); *H04L 41/12* (2013.01); *G05B 2219/23295* (2013.01); *G05B 2219/25428* (2013.01); *H04L 12/2812* (2013.01); *H04L 2012/4026* (2013.01)

(58) Field of Classification Search
CPC ................... H04L 2012/4026; H04L 12/2812; H04L 41/12; H04L 41/082
USPC .................................................. 709/221–227
See application file for complete search history.

(56) References Cited

U.S. PATENT DOCUMENTS

| | | |
|---|---|---|
| 5,960,214 A | 9/1999 | Sharpe |
| 6,011,915 A | 1/2000 | Aaker |
| 6,023,585 A | 2/2000 | Perlman |
| 6,044,305 A | 3/2000 | Larson |
| 6,047,222 A | 4/2000 | Burns |
| 6,278,960 B1 | 8/2001 | De Groot |

(Continued)

FOREIGN PATENT DOCUMENTS

| | | |
|---|---|---|
| DE | 198 27 698 A1 | 2/1999 |
| DE | 19844679 A1 | 4/1999 |

(Continued)

OTHER PUBLICATIONS

Translation of wo0239638 a2.*

*Primary Examiner* — Hitesh Patel
(74) *Attorney, Agent, or Firm* — Bacon & Thomas, PLLC

(57) ABSTRACT

A method for updating device descriptions for field devices in process automation technology by loading the required descriptions from an external server (S), by means of an application program, into a controller (for example, PC1; PC2).

8 Claims, 1 Drawing Sheet

(56) References Cited

U.S. PATENT DOCUMENTS

| | | |
|---|---|---|
| 6,360,255 B1 | 3/2002 | McCormack |
| 6,424,872 B1 | 7/2002 | Glanzer |
| 6,754,703 B1 | 6/2004 | Spring |
| 7,069,552 B2 | 6/2006 | Lindberg |
| 7,085,814 B1 | 8/2006 | Gandhi |
| 7,263,546 B1 | 8/2007 | Kostadinov |
| 7,266,812 B2 | 9/2007 | Pagnano |
| 8,250,174 B2* | 8/2012 | Von Stein et al. .............. 709/218 |
| 2002/0004370 A1* | 1/2002 | Stengele et al. ................ 455/39 |
| 2002/0078161 A1 | 6/2002 | Cheng |
| 2003/0076242 A1 | 4/2003 | Burns |
| 2003/0229472 A1 | 12/2003 | Kantzes |
| 2004/0015952 A1* | 1/2004 | Lajoie et al. .................. 717/171 |
| 2004/0262387 A1 | 12/2004 | Hart |
| 2014/0279764 A1* | 9/2014 | Lahr .............................. 706/12 |

FOREIGN PATENT DOCUMENTS

| | | |
|---|---|---|
| DE | 10 023 703 A1 | 5/2000 |
| DE | 10 032 774 A1 | 1/2002 |
| DE | 10029448 A1 | 1/2002 |
| EP | 0 989 713 A2 | 3/2000 |
| WO | WO 02/39638 A2 | 5/2002 |
| WO | WO 0239638 A2 * | 5/2002 |

* cited by examiner

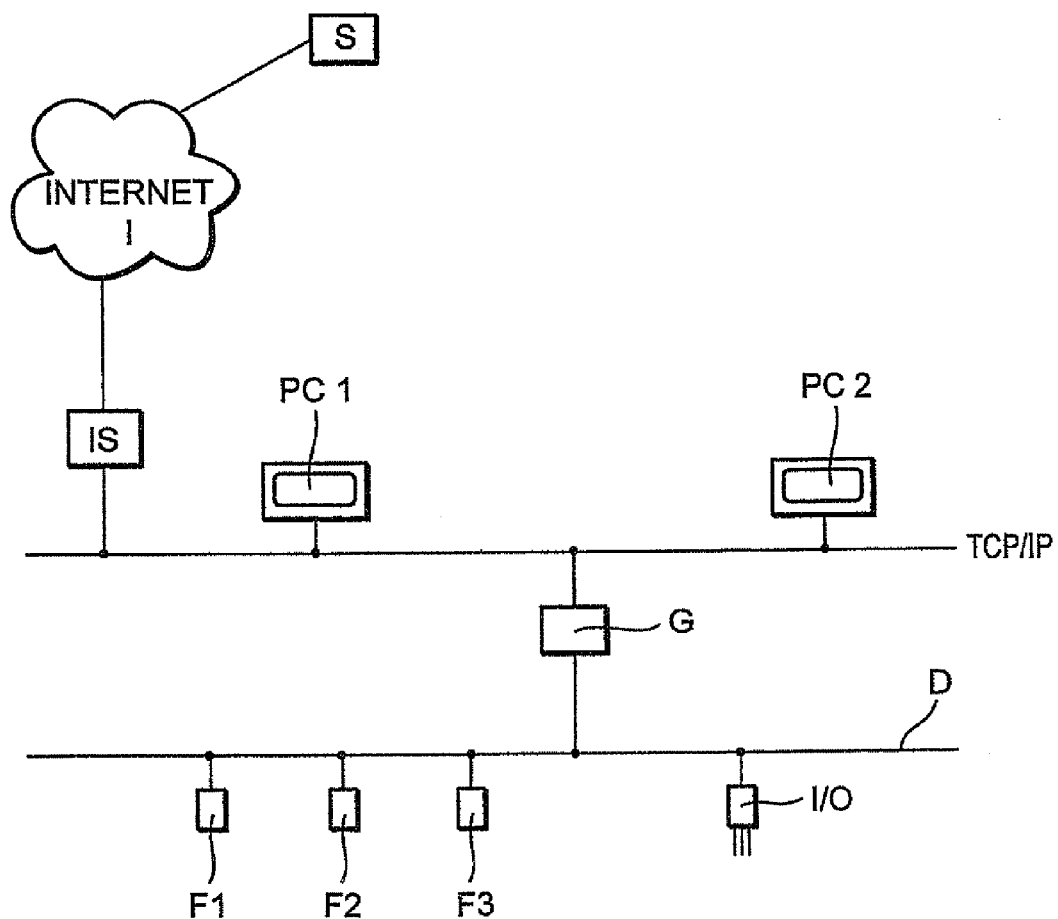

METHOD FOR UPDATING DEVICE DESCRIPTIONS FOR FIELD DEVICES IN PROCESS AUTOMATION TECHNOLOGY

CROSS-REFERENCE TO RELATED APPLICATION

This application is a Continuation application which claims the benefit of U.S. application Ser. No. 10/522,586, which was filed on Jan. 26, 2005, which is the U.S. National Stage of PCT/EP2003/007839, filed on 18 Jul. 2003.

FIELD OF THE INVENTION

The invention relates to a method for updating device descriptions for field devices of process automation technology.

BACKGROUND OF THE INVENTION

In the field of process automation technology, in many cases, field devices are used for registering and influencing process variables. Examples of field devices are temperature measuring devices, which register the temperature of a medium; flow rate meters, which register the flow rate of a medium in a section of piping; or fill level meters, which register the fill level of a liquid or bulk goods in a container.

Field devices are normally connected via a data or field bus with superordinated control units, e.g. process control systems PCS or an engineering system, from which the process activity is controlled or monitored, and also from which direct access to individual field devices is possible. As a result of the direct access to the field device, settings at the field device can be changed from the control unit, or diagnostic functions of the field device can be called up. In the control unit, the measurement values of the different sensors are evaluated or monitored, and, for process control, the appropriate actuators are activated. Data transfer between field device and control units is carried out according to known international standards for field buses, such as e.g. HART®, Foundation Fieldbus®, Profibus®, or CAN-Bus®, etc.

Frequently in process automation technology, field devices from different manufacturers are used. The servicing, or operating, of field devices is carried out by means of PC-based applications, which especially support the parameterization, start-up, and diagnostics of individual field devices, in part also graphically.

Examples for such display- and service-programs are AMS® of Fisher-Rosemount, Simatic PDM® of Siemens, Smart Vision® of ABB, WO® of Vega, or Commuwin® II of Endress+Hauser.

In order to enable the servicing of different field devices from a control unit, the functionality of the respective field device must be known to the control device. The functionality of the field device is described by means of a so-called device description (Device Descriptions DDs). For this, a special language, the device descriptions language, is available. By means of this standardized language, the necessary information concerning the functionality of a specific field device can be made available to other bus participants, especially the control system, or an additional service device (handheld device). Normally the device descriptions are created by the field device manufacturer, and are delivered with the respective field device e.g. on disk.

At the start-up of the field device, the appropriate device description is then installed from the application program.

This is problematic in that device descriptions are periodically updated by the manufacturer. The updated device descriptions (updates) must then be sent to the corresponding user, and are then subsequently installed manually using the application program.

In this procedure, it is not guaranteed that the user is, in fact, using the most recent update of the device description. Especially in the case of safety-related process applications, it is mandatory that the most recent data description is made available to the user, especially when programming errors (bugs fixing) have appeared in a version of a device description.

SUMMARY OF THE INVENTION

An object of the present invention is to provide a method for updating device descriptions for field devices in process automation technology, which method does not have the above-mentioned disadvantages, and which especially enables a simpler and more secure updating.

This object is achieved by means of an application program in a control unit, for example PCs, which downloads device descriptions for field devices from an external server.

An essential idea of the invention includes the storing of device descriptions for field devices on a central server, and that, in a control unit, an application program, which requires corresponding device information for servicing a field device, downloads such from the server, following query of the device type of the field device.

BRIEF DESCRIPTION OF THE DRAWING

The invention will now be explained in greater detail on the basis of an example of an embodiment illustrated in the drawing, the figure of which shows as follows:

FIG. 1 a schematic representation of a process automation installation.

DETAILED DESCRIPTION OF THE PREFERRED EMBODIMENT

FIG. 1 shows a process automation installation with multiple field devices F1, F2, F3, which are connected with a firm, or company, network by way of a data or field bus D and a gateway G. The field devices F1, F2, F3 can be e.g. pressure meters, temperature meters, or flow rate meters, etc. In addition to the field devices, a remote I/O is also connected to the data bus. By way of the remote I/O, HART® field devices can be connected to the data bus D. The data bus can be e.g. a Foundation Fieldbus® H1-bus. The firm network F works e.g. according to the Ethernet standard (TCP/IP protocol). Two computers (e.g. workstations or PCs) PC1, PC2 are connected to the firm network F as control units, which serve for the control, engineering, or monitoring of the process system. Furthermore, the firm network F is connected with a firewall IS, which communicates via the Internet I with a remote server S.

The method of the invention will now be described in greater detail. If, e.g. in a control unit, e.g. computer PC1, a special application e.g. for servicing, configuring, parameterizing, or troubleshooting a field device F1, F2, F3 is running, which, for its operation, requires device descriptions for field devices, then the application program sends a request to the field device to be serviced e.g. F1, and requests the device type of this field device. If the application program in the control unit does not possess the required information for this specific field device F1, or does not possess this required information in the updated version, then the necessary device descriptions are downloaded via the Internet from the server S, on which the most up-to-date device descriptions are stored.

In this way, the most recently updated device descriptions are always available in the application program. In order to avoid an unnecessary data transfer, the updated device information is only downloaded from the server S when it differentiates the device information saved in the control unit PC1 from that stored in field device F1. This is especially the case at the start-up of the field device, because at this time, still no information concerning this field device is stored in the control unit PC1.

Since device descriptions can change over time due to updates and error corrections (bug fixing), the application program queries the server S in regular intervals, as to whether changed device descriptions are available.

Most simply, the connection between control unit PC1 or PC2 and server S is accomplished via the internet I, through the firewall IS.

The connection between the control unit PC1 and field device F1 is accomplished via a data bus D. The display and service program CommuWin II®, of the firm Endress+ Hauser, allows a graphic device parameterization, device diagnostics with error codes and textual explanations, as well as providing the device servicing, or device operating. For this application, device descriptions DDs are required.

Advantageously, the device descriptions, therefore, are the device descriptions DD for the field devices F1, F2, F3.

Since not only device descriptions can change over time, but also firmware for specific field devices, it makes sense to download the current firmware from the server S as well.

As a result of the query of the application program to the server S, specific information of various field devices and various field device users is transferred to the server S. This information can be buffered in the server S for statistical purposes. For the user, it is certainly very advantageous when the updated device description, and/or the updated firmware, is automatically installed.

A further advantage of the method of the invention is that preconfigured device descriptions for specific applications of a field device are stored in the server S, and, following appropriate selection by the user, are loaded from the application program. The parameterization of field devices is thereby greatly simplified.

To some extent, application programs (e.g. ToF-Tool® of Endress+Hauser) also use the appropriate national language.

The device descriptions are simply stored in the respective national language. In this way, the required information is made available to the user in his/her national language, and translation errors are easily corrected. With the aid of the method of the invention, it is assured that the most recent device descriptions are always available to an application program.

The invention claimed is:

1. A method for updating device descriptions for different field devices, sensors or actuators, for determining and influencing process variables in process automation technology, whereby the field devices are connected via a field bus,
   whereby in each case a device description describes the functionality of the corresponding field device in a standardized language and
   whereby a control unit and an external server are employed, and
   whereby from the control unit a process activity is controlled or monitored and from which direct access to individual field devices is possible,
   wherein data transfer between the field devices and the control unit is carried out according to an international standard for field buses, comprising the steps:
   storing preconfigured device descriptions for specific applications of the field devices on a central server connected to the field bus via Internet,
   storing and running an application program in the control unit for servicing, configuring, parameterizing, or troubleshooting the field device, which application program requires device descriptions for field devices for its operation;
   downloading from the central server via the internet, by the application program in the control unit, the preconfigured device description of the corresponding field device to be serviced;
   wherein following a query of the device type of the field device corresponding device information for servicing the field device is downloaded from the central server.

2. The method as claimed in claim 1 wherein in the case that a preconfigured version of the device description of the field device is not available in the control unit the necessary device descriptions are downloaded via the internet from the central server.

3. The method as claimed in claim 1 wherein the most up-to-date device descriptions are stored on the central server.

4. The method as claimed in claim 1 wherein the updated device information is only downloaded from the central server when the device information saved in the control unit differentiates from that stored in the field device.

5. The method as claimed in claim 1 wherein following appropriate selection by a user preconfigured device descriptions for specific applications of a field device which are stored on the central server are loaded from the application program.

6. The method as claimed in claim 1 wherein the device descriptions on the central server are stored in respective national language.

7. The method as claimed in claim 1 wherein a current firmware for specific field devices are downloaded from the central server as well.

8. The method as claimed in claim 1 wherein as a result of the query of the application program specific information of various field devices and various users is transferred to the central server.

* * * * *